United States Patent [19]

Suzuki et al.

[11] Patent Number: 5,557,189
[45] Date of Patent: Sep. 17, 1996

[54] METHOD AND APPARATUS INCLUDING A CURRENT DETECTOR AND A POWER SOURCE CONTROL CIRCUIT FOR CHARGING A NUMBER OF BATTERIES

[75] Inventors: Mamoru Suzuki, Saitama; Minoru Iijima, Tokyo; Yasuyuki Ishihama; Nobuhiro Fujiwara, both of Kanagawa, all of Japan

[73] Assignee: Sony Corporation, Tokyo, Japan

[21] Appl. No.: 352,618

[22] Filed: Dec. 9, 1994

[30] Foreign Application Priority Data

Dec. 24, 1993 [JP] Japan ..................... 5-328352
Sep. 8, 1994 [JP] Japan ..................... 6-214917

[51] Int. Cl.$^6$ ................. H01M 10/44; H01M 10/46
[52] U.S. Cl. ............................ 320/18; 320/22
[58] Field of Search ..................... 320/6, 15, 17, 320/18, 22, 23, 24

[56] References Cited

U.S. PATENT DOCUMENTS 4,238,721 12/1980 DeLuca et al. ............... 320/18
4,614,905 9/1986 Petersson et al. ............. 320/18
5,387,857 2/1995 Honda et al. ................. 320/18

Primary Examiner—Peter S. Wong
Assistant Examiner—Patrick B. Law
Attorney, Agent, or Firm—Jay H. Maioli

[57] ABSTRACT

A battery charging apparatus for charging the electricity from a current source to a cell includes a variable resistor in parallel with the cell, a cell voltage detection unit for detecting the current voltage value of the cell and a comparator for comparing the current voltage value to a pre-set voltage value. The resistance value of the variable resistor is controlled responsive to the results of comparison so that the current from the current source is caused to flow through both the cell and the variable resistor with progress in the charging of the cell. The current is prevented from flowing through the cell when the cell is fully charged, so that overcharging is eliminated. If plural cells are charged in series, the control operation of not causing the current to flow through the fully charged cell can be carried out for each of the cells, so that integrated charging may be continued until all of the cells are fully charged thus shortening the cell charging time.

3 Claims, 11 Drawing Sheets

METHOD AND APPARATUS INCLUDING A CURRENT DETECTOR AND A POWER SOURCE CONTROL CIRCUIT FOR CHARGING A NUMBER OF BATTERIES

BACKGROUND OF THE INVENTION

This invention relates to a battery charging device for charging a lithium ion cell or a nickel cadmium cell, a battery pack having secondary cells, such as lithium ion cells or nickel cadmium cells, a battery charging method in case of charging plural cells, and a battery evaluating device for evaluating the performance of a cell set made up of plural series-connected cells.

Rechargeable cells or secondary cells, such as lithium ion cells or nickel cadmium cells, are nowadays known. These secondary cells are charged by a battery charging device shown for example in FIG. 1.

With the battery charging device, shown in FIG. 1, a charging positive terminal 51 is connected via a switch 53 to a positive electrode of a dc current source 50. A charging negative electrode 52 is connected to a negative terminal of the dc current source 50. Three secondary cells 54, for example, are connected in series across the charging positive electrode 51 and the charging negative electrode 52. Three discharging circuits, each comprised of a resistor 55 and a switch 56, are connected in parallel with the secondary cells 54 across the charging electrodes 51 and 52.

With the above battery charging device, the secondary cells 54 start to be charged on turning the switch 53 on. On starting the charging, the switches 56 of the discharging circuits are turned off.

If the secondary cells 54, thus connected in series with one another, are charged, the cells are charged to variable charging states, since the cells 54 are liable to variations in capacities.

The conventional practice for combatting such inconvenience has been to detect the voltages of the three secondary cells 54 and to turn on the switch 56 of the secondary cell 54 charged at the highest charging rate and the switch 56 of the secondary cell 54 charged at the second highest charging rate in case of occurrence of variations in the charging states of the three cells. This discharges electricity so far stored in the secondary cell 54 charged at the highest charging rate and in the secondary cell 54 charged at the second highest charging rate via the resistors 55.

When discharging of the secondary cell 54 charged at the highest charging rate and discharging of the secondary cell 54 charged at the second highest charging rate proceed and voltage values of these secondary cells 54 become equal to the voltage value of the secondary cell 54 charged at the lowest charging rate, the switches 56 of the discharging circuits which have been turned on are turned off, thus re-initiating charging.

With the above-described conventional battery charging device, charging and discharging are repeated by the on/off operation of the switch 58 for uniformly charging the secondary cells.

However, if the cells are charged with repetition of alternate charging and discharging operations, the totality of the cells are charged for conformity to the charging state of the secondary cell charged at the lowest charging rate, thus necessitating excessive time until full charging of the secondary cells is achieved.

In addition, battery charging is perpetually beset with the problem of excess charging. Such excess charging imposes load on the circuits of the batteries and the charging circuits, thus affecting safety due to heat evolution or breakage. Thus a demand has been raised for a battery charging device whereby excess charging may be eliminated to permit charging in safety.

On the other hand, the battery performance is evaluated by repeating a cycle of charging, dwell, discharging and dwell a plural number of times. However, sufficient quality evaluation has not been achieved with the battery being in use because the charging, dwell and discharging occur in an irregular manner. Besides, with a set of cells made up of plural series-connected cells, charging needs to be terminated at a time point when the cell having the least capacity is fully charged, such that it is not possible to evaluate the cells taking into account the variations in cell capacity from cell to cell and hence it is not possible to evaluate the true cell performance as a set of cells.

OBJECTS AND SUMMARY OF THE INVENTION

In view of the foregoing, it is an object of the present invention to provide a battery charging device, a battery pack and a battery charging method whereby the cell charging time can be shortened and charging may be achieved in safety.

It is another object of the present invention to provide a battery evaluating device whereby it becomes possible to evaluate the true performance of a set of cells made up of series-connected plural cells.

In one aspect, the present invention provides an apparatus for charging electricity from a power source circuit in a cell. The charging apparatus comprises variable current means connected in parallel with the cell for varying the value of the current supplied to the cell, cell voltage detection means for detecting the current voltage value of the cell, pre-set voltage outputting means for outputting a pre-set voltage indicating a pre-set voltage value of the cell, and comparator-control means for comparing the voltage of the cell as detected by the cell voltage detection means to the pre-set voltage from the pre-set voltage outputting means for detecting the current voltage of the cell with respect to the pre-set voltage. The comparator-control means controls the variable current means so that the current flowing through the variable current means is increased as the current voltage value of the cell approaches the pre-set voltage.

In another aspect, the present invention provides an apparatus for charging electricity from a power source circuit in a cell. The charging apparatus comprises a plurality of charging units each having current changing means connected in parallel with the cell for changing the current supplied to the cell, cell voltage detection means for detecting the voltage of the cell, pre-set voltage outputting means for outputting a preset voltage indicating a pre-set voltage value of the cell, and comparator-control means for comparing the voltage of the cell as detected by the cell voltage to the pre-set voltage from the pre-set voltage outputting means for detecting the current voltage of the cell with respect to the pre-set voltage. The comparator-control means controls the current changing means so that the current flowing through the current changing means is increased as the current voltage value of the cell approaches the setting voltage. The charging units are connected in series with one another.

In a further aspect, the present invention provides a battery pack. The battery pack comprises a chargeable cell, a positive electrode terminal connected to the positive electrode of the cell and to the positive electrode of a power source circuit, a negative electrode terminal connected to the negative electrode of the cell and to the negative electrode of the power source circuit, variable current means connected across the positive and negative electrode terminals in parallel with the cell for varying the current supplied to the cell, cell voltage detection means for detecting the cell voltage, pre-set voltage outputting means for outputting a pre-set voltage indicating the pre-set voltage of the cell, and comparator-control means for comparing the voltage of the cell as detected by the cell voltage detection means to the pre-set voltage from the pre-set voltage outputting means for detecting the current voltage of the cell with respect to said setting voltage. The comparator-control means controls the current changing means so that the current flowing through the variable current means is increased as the current voltage value of the cell approaches the pre-set voltage.

In a further aspect, the present invention provides a battery pack. The battery pack comprises a plurality of charging units each having a chargeable cell, a positive electrode terminal connected to the positive electrode of the cell and to the positive electrode of a power source circuit, a negative electrode terminal connected to the negative electrode of the cell and to the negative electrode of the power source circuit, variable current means connected across the positive and negative electrode terminals in parallel with the cell for varying the current supplied to the cell, cell voltage detection means for detecting the cell voltage, pre-set voltage outputting means for outputting a pre-set voltage indicating the pre-set voltage of the cell, and comparator-control means for comparing the voltage of the cell as detected by the cell voltage to the pre-set voltage from the pre-set voltage outputting means for detecting the current voltage of the cell with respect to the setting voltage. The comparator-control means controls the variable current means so that the current flowing through the current changing means is increased as the current voltage value of the cell approaches the pre-set voltage. The charging units are connected in series with one another.

In a still further aspect, the present invention provides a method for charging the electricity from the power source circuit to a plurality of cells. The charging method comprises the steps of controlling a plurality of variable current means connected parallel to the cells for varying the current supplied to the cells so that the current flowing through the variable current means is gradually increased as the current voltage value approaches the pre-set voltage value, detecting the current values of the variable current means for detecting the minimum current value from among said current values and an output current value of the power source circuit, generating a subtraction current value by subtracting the minimum current value of the variable current means from the output current value of the power source circuit, and controlling the power source circuit so that the output current value of the power source circuit becomes equal to the subtraction current value.

In yet another aspect, the present invention provides a battery evaluating apparatus. The apparatus comprises variable current source and a first variable resistor connected in a main current path having a plurality of chargeable cells connected in series with one another, a main current sensor for detecting the value of the current flowing in the main current path, a plurality of second variable resistors connected in parallel with the cells, a plurality of load current sensors for detecting the value of the current flowing in the variable resistors, evaluation means for controlling the variable current source and the first and second variable resistors in accordance with a battery evaluation program for evaluating the cell performance based on current values detected by the main current sensor and the load current sensor, and outputting means for outputting the results of evaluation by the evaluation means.

With a battery charging apparatus of the present invention, variable current means for varying the current flowing in the cell is connected in parallel with the cell. Such variable current means includes a variable resistor constituted by a field effect transistor (FET) in which the current between the source and the drain is changed by changing the voltage applied to the gate electrode.

The cell voltage detection means detects the current voltage value of the cell and transmits the detection output to comparator control means. Pre-set voltage outputting means transmits a pre-set voltage value, such as a voltage value on full charging of the cell, to the comparator control means, which then compares the cell voltage as detected by the cell voltage detection means to the pre-set voltage from the pre-set voltage outputting means for detecting the current cell voltage value with respect to the pre-set voltage value. The variable current means is controlled so that more current will flow through the variable current means as the current cell voltage value approaches the pre-set voltage value.

Specifically, should the variable resistor be provided as the variable current means, the current is initially caused to flow through the cell by controlling the resistance value of the variable resistor to be of the maximum value. As the current cell voltage approaches the pre-set voltage, the resistance value of the variable resistor is controlled to be gradually smaller for gradually increasing the current flowing through the variable resistor. Specifically, the voltage applied to the gate electrode of the FET is initially diminished for decreasing the source-drain current for causing more current to flow through the cell. As-the current cell voltage value approaches the pre-set voltage, the voltage applied to the gate electrode of the FET is increased for increasing the source-to-drain current and diminishing the current through the cell.

Thus it becomes possible to gradually reduce the current through the cell as the charging proceeds and the cell voltage approaches the pre-set voltage (full-charged voltage) and hence to prevent overcharging from its occurrence.

Another battery charging apparatus of the present invention includes a plurality of the above-mentioned battery charging apparatus as charging units connected in series with one another. As described above, it is possible with each charging unit to gradually decrease the current flowing in the cell as charging progresses and,the cell voltage approaches the pre-set voltage, that is the fully-charged voltage, and hence to prevent overcharging of the cell of each charging unit. Since overcharging may be prevented in this manner, each cell can be charged to its full capacity in safety without variations. Since such control can be effected from cell to cell, integrated charging can be continued until all of the cells are charged fully, thus rendering it possible to diminish the cell charging time.

Meanwhile, if the current through the cell is gradually decreased as the cell approaches its full capacity, and the current through the variable current means is correspondingly increased, the current continues to flow through the variable current means even althought the cell is charged to its full capacity. This not only means wasteful power consumption, but also tends to destruct the variable current means through overheating.

Thus the battery charging apparatus of the present invention includes a variable output current power source circuit, and the current flowing in each variable current means is detected by plural first current detection means provided in association with the variable current means of the charging units, while the output current value from the power source circuit is also detected by second current detection means. Power source circuit control means is responsive to each detection output of the first current detection means to detect the minimum current value from among current values of each variable current means.

The power source circuit control means subtracts the minimum current value from the output current value of the power source circuit and controls the output current value of the power source circuit so as to be equal to a value calculated by this subtraction.

The fact that the current value of the variable current means is of the minimum value means that the charging of the cell provided with such variable current means is in the most belated state. Thus, by subtracting the above minimum current value from the output current value of the power source circuit and controlling the output current value of the power source circuit so as to be equal to the value obtained by such subtraction, the output current of the power source circuit can be gradually lowered with the progress in the charging of the cell in the most belated charging state.

Consequently, the power source circuit can be turned off when the cell in the most belated charging state has been charged to its full capacity, so that, if plural cells are to be charged by parallel charging, all of the cells can be charged fully without variations with the minimum power consumption. On the other hand, since the output current value of the power source circuit can be decreased with the progress in the charging of the cell in the most belated charging state, it becomes possible to decrease the current flowing in the variable current means of the remaining charging units to prevent heating and resulting destruction of the variable current means. In addition, since charging can be continued until all of the cells are charged fully, the cells can be fully charged in a shorter time.

With another battery charging apparatus of the present invention, the power source circuit control means detects the maximum current among current values of the variable current means based upon detection outputs of the first current detection means, and subtracts the pre-set maximum load indicating the maximum value of the current that can flow in the variable current means from the above maximum current to form a first subtraction current value, while detecting the polarity of the first subtraction current value. The power source circuit control means generates a second subtraction current value by subtracting the first subtraction current value from the output current value of the power source circuit detected by the second current detection means and controls the power source circuit so that the output current value of the power source circuit will be equal to the second subtraction current value only when the first subtraction current value is of the positive polarity.

That is, since the first subtraction current value is equal to the maximum current value less the maximum load setting value, the first subtraction current value indicates the charging state of the cell provided in the charging unit.

On the other hand, the current value of the variable current means being of the maximum value indicates that the cell provided in the charging unit having such variable current means is in the most advanced charging state, and the first subtraction current being of the negative polarity indicates that the current flowing in the variable current means can be increased. Thus the power source circuit control means does not perform a control operation of lowering the output current value of the power source circuit.

Conversely, the first subtraction current being of the positive polarity indicates that the current in excess of the above-mentioned maximum load setting value is flowing in the variable current means. Thus the power source control means controls the power source circuit for lowering the output current value of the power source circuit.

Such control lowers the output current value of the power source circuit responsive to the state of the cell in the most advanced charging state, thus delaying the charging of the remaining cells. However, the instant the current flowing in the variable current means of the charging unit having the cell in the most advanced charging state exceeds the maximum load setting value, the current value can be lowered instantly, so that the variable current means can be protected and heating and resulting destruction of the variable current means can be prevented from occurring.

With a battery pack according to the present invention, variable current means for varying the current flowing in the secondary cell is connected in parallel with the cell. The variable current means may be a variable resistor.

The cell voltage detection means detects the current voltage value of the cell and transmits the detection output to comparator-control means. The pre-set voltage outputting means supplies a pre-set voltage indicating the pre-set cell voltage, such as the fully-charged voltage, to the comparator-control means, which then compares the cell voltage as detected by the cell voltage detection means to the pre-set voltage from the preset voltage outputting means for detecting the current cell voltage value with respect to the pre-set voltage value. The comparator-control means controls the variable current means so that more current will flow in the variable current means as the current cell voltage value approaches the pre-set voltage value.

Specifically, should the variable resistor be used as the variable current means, the resistance value of the variable resistor is initially controlled to be maximum to cause the current to flow in the cell. As the current cell voltage approaches the pre-set voltage value, the resistance value of the variable resistor is controlled to be gradually smaller in order to gradually increase the current flowing in the variable resistor. Specifically, the voltage applied to the gate electrode of the FET is initially decreased for decreasing the current flowing in the source-to-drain path for supplying more current to the cell. As the current cell voltage approaches the pre-set voltage value, the voltage applied to the gate electrode of the FET is increased for increasing the source-drain current for reducing the current flowing in the cell.

Thus the current flowing in the cell can be gradually decreased as the charging progresses and the cell voltage value approaches the pre-set voltage (full-charging), thus rendering it possible to prevent the overcharging.

Another battery pack according to the present invention has plural charging units connected in series with one another. Each charging unit supplies a decreased amount of the current to the cell as the charging progresses and the cell voltage approaches the pre-set voltage (full-charging). This results in prevention of overcharging of the cells provided in each charging unit. Since the overcharging can be prevented from occurring in this manner, each cell can be charged to its full capacity without variations.

If the current flowing in the variable current means is increased for gradually decreasing the current supplied to the cell, as the cell approaches its fully charged state, the current continues to flow in the variable current means even if the cell has been charged to its full capacity. This means not only the wasteful power consumption, but also tends to destruct the variable current means by heat evolution.

Thus the battery pack of the present invention has plural first current detection means associated with variable current means of the plural charging units and second current detection means for detecting the current flowing in the variable current means and the output current value of the power source circuit, respectively. On the other hand, control signal outputting means is responsive to the detection output from each of the first current detection means for detecting the minimum current value among the current values of the variable current means.

The control signal outputting means subtract the minimum current value from the output current value of the power source circuit detected by the second current detection means and outputs a control signal controlling the power source circuit so that the output signal of the power source circuit will be equal to the value calculated by such subtraction.

The fact that the current value of the variable current means is of the minimum value means that the charging of the cell provided with such variable current means is in the most belated state. Thus, by subtracting the above minimum current value from the output current value of the power source circuit and controlling the output current value of the power source circuit so as to be equal to the value obtained by such subtraction, the output current of the power source circuit can be gradually lowered with the progress in the charging of the cell in the most belated charging state.

Consequently, the power source circuit can be turned off when the cell in the most belated charging state has been charged to its full capacity, so that, if plural cells are to be charged by parallel charging, all of the cells can be charged fully without variations with the minimum power consumption. On the other hand, since the output current value of the power source circuit can be decreased with the progress in the charging of the cell in the most belated charging state, it becomes possible to decrease the current flowing in the variable current means of the remaining charging units to prevent heating and resulting destruction of the variable current means. In addition, since charging can be continued until all of the cells are charged fully, the cells can be fully charged in a shorter time.

With the battery charging apparatus of the present invention, the power source circuit control means detects the maximum current among current values of the variable current means based upon detection outputs of the first current detection means, and subtracts the pre-set maximum load indicating the maximum value of the current that can flow in the variable current means from the above maximum current to form a first subtraction current value, while detecting the polarity of the first subtraction current value. The power source circuit control means generates a second subtraction current value by subtracting the first subtraction current value from the output current value of the power source circuit detected by the second current detection means and controls the power source circuit so that the output current value of the power source circuit will be equal to the second subtraction current value only when the first subtraction current value is of the positive polarity.

That is, since the first subtraction current value is equal to the maximum current value less the maximum load setting value, the first subtraction current value indicates the charging state of the cell provided in the charging unit.

On the other hand, the current value of the variable current means being of the maximum value indicates that the cell provided in the charging unit having such variable current means is in the most advanced charging state, and the first subtraction current being of the negative polarity indicates that the current flowing in the variable current means can be increased. Thus the control signal outputting means does not output the above-mentioned control signal.

Conversely, the first subtraction current being of the positive polarity indicates that the current in excess of the above-mentioned maximum load setting value is flowing in the variable current means. Thus the control signal outputting means outputs a control signal of controlling the power source circuit for lowering the output current value of the power source circuit.

Such control lowers the output current value of the power source circuit responsive to the state of the cell in the most advanced charging state, thus delaying the charging of the remaining cells. However, the instant the current flowing in the variable current means of the charging unit having the cell in the most advanced charging state exceeds the maximum load setting value, the current value can be lowered instantly, so that the variable current means can be protected and heating and resulting destruction of the variable current means can be prevented from occurring.

The battery charging method according to the present method is the method of charging the electricity from a power source circuit to plural cells. The current caused to flow in the plural variable current means provided in parallel with the cells is controlled to be gradually increased as the current voltage value of each cell approaches the pre-set voltage value. This makes it possible to gradually decrease the current supplied to the cell as the charging of the cell progresses and the cell voltage approaches the pre-set voltage or fully charged voltage and hence to prevent the overcharging.

The current values of the variable current means, the minimum current among these current values and output currents of the power source circuit are detected, and the above minimum current value is subtracted from the output current value of the power source circuit to generate a subtracted current value. The power source circuit is controlled so that the output current value of the power source circuit will be equal to the subtraction current value.

This makes it possible to decrease the output current value of the power source circuit gradually with the progress of charging of the cell in the most belated charging state. Consequently, the power source circuit can be turned off when the cell in the most belated charging state is charged to its full capacity, such that, when plural cells are charged by parallel operation, these cells can be charged fully with the minimum power consumption without variations from cell to cell. On the other hand, since the output current value of the power source circuit can be lowered with the progress of the charging of the cell in the most belated charging state, the current flowing in the remaining variable current means may be decreased for preventing heat evolution and consequent destruction of the variable current means.

With a battery evaluation apparatus according to the present invention, a variable current source and a first variable resistor provided in parallel in a main current path and plural second variable resistors connected in parallel with plural chargeable cells connected in series with the main current path are controlled by evaluation means in accordance with a battery evaluation program. Besides, cell performance evaluation is effected based upon the current values detected by a main current sensor detecting the current flowing in the main current path and a load current sensor detecting the current value in each variable resistor and the results of evaluation are outputted by outputting means.

In addition, the battery evaluation apparatus according to the present invention evaluates temperature characteristics by the evaluation means based upon the detection output by the temperature sensor measuring the temperature of each cell.

With the battery evaluation apparatus according to the present invention, the variable current source and the variable resistors are variably controlled by the evaluation means in accordance with the battery evaluation program conforming to evaluation conditions set by setting entry means, and the cell performance is evaluated based upon current values detected by the main current sensor and the load current sensors.

With the battery charging apparatus, battery pack and the battery charging method, the current is not allowed to flow through the cell charged to its full capacity, so that overcharging may be prevented from occurring. If plural cells are charged in parallel, the control of not allowing the current to flow in the cell charged to its full capacity may be separately performed for each cell, so that integrated charging can be continued until all of the cells are fully charged, thus rendering it possible to shorten the cell charging time.

On the other hand, with the battery charging apparatus, battery pack and with the battery charging method according to the present invention, the output current value of the power source current can be controlled depending on the charged state of the cell in the most belated charging state, among plural cells to be charged in parallel, these cells can be charged in their entirety without variations with the minimum power consumption. Besides, the current flowing through the variable resistors of the other charging units can be decreased for preventing heat evolution and resultant destruction of the variable current means. Since charging can be continued until all of the cells are charged fully, the cells can be charged in their entirety within a shorter time.

In addition, with the battery charging apparatus and the battery pack according to the present invention, the current flowing in the variable current means associated with the cell in the most advanced charging state may be instantly lowered when the current exceeds the above-mentioned pre-set maximum load value, so that heat evolution and consequent destruction of the variable resistors can be prevented from occurring.

Furthermore, with the battery evaluation apparatus according to the present invention, the respective cells can be charged fully, while the capacity difference among the cells, true capacity as the set of cells and true cyclic characteristics as the set of cells, that is capacity changes due to repeated charging and discharging operations, can be evaluated safely and accurately. Besides, the actual using states can be simulated, while analyses of troubles on the market or evasion of possible troubles as well as pre-shipment quality control may be performed thoroughly.

DESCRIPTION OF THE PREFERRED EMBODIMENTS

Figure 1:
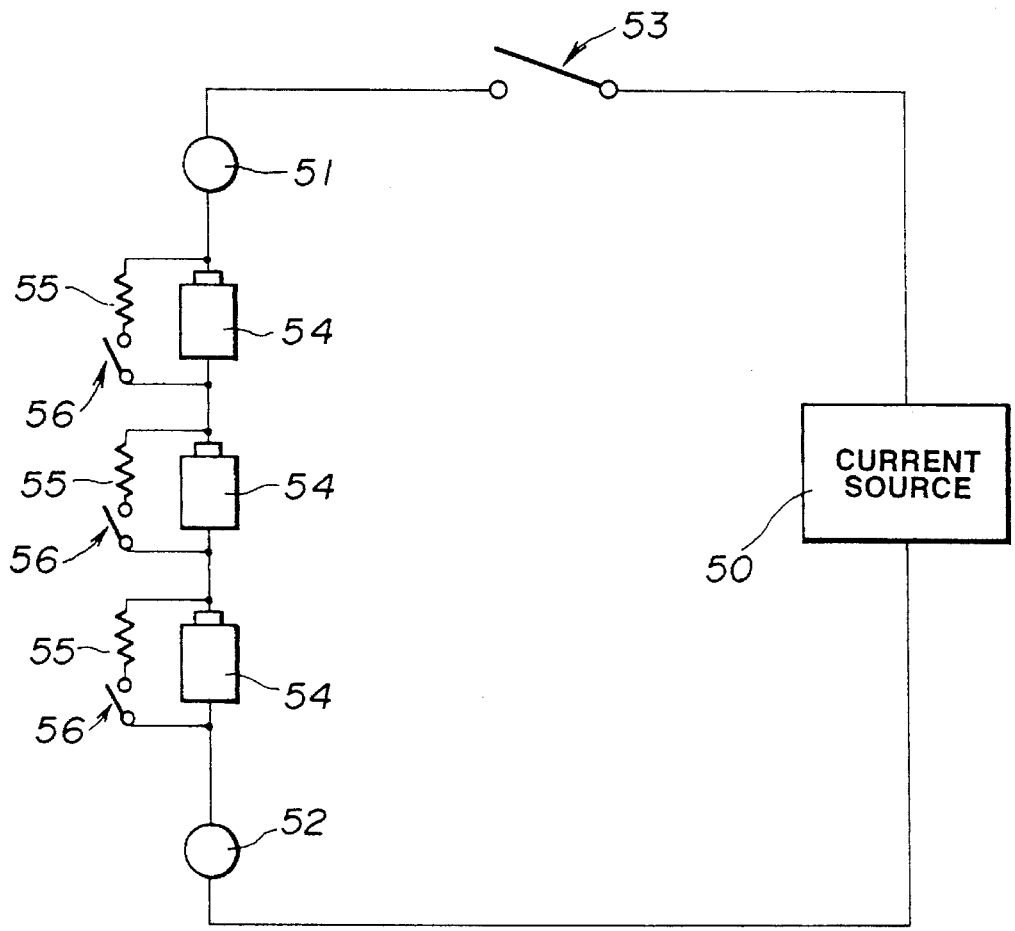
FIG. 1 is a block diagram showing a conventional battery charging device.

Referring to the drawings, preferred embodiments of the battery charging device, battery pack and the battery charging method according to the present invention are explained in detail.

Figure 2:
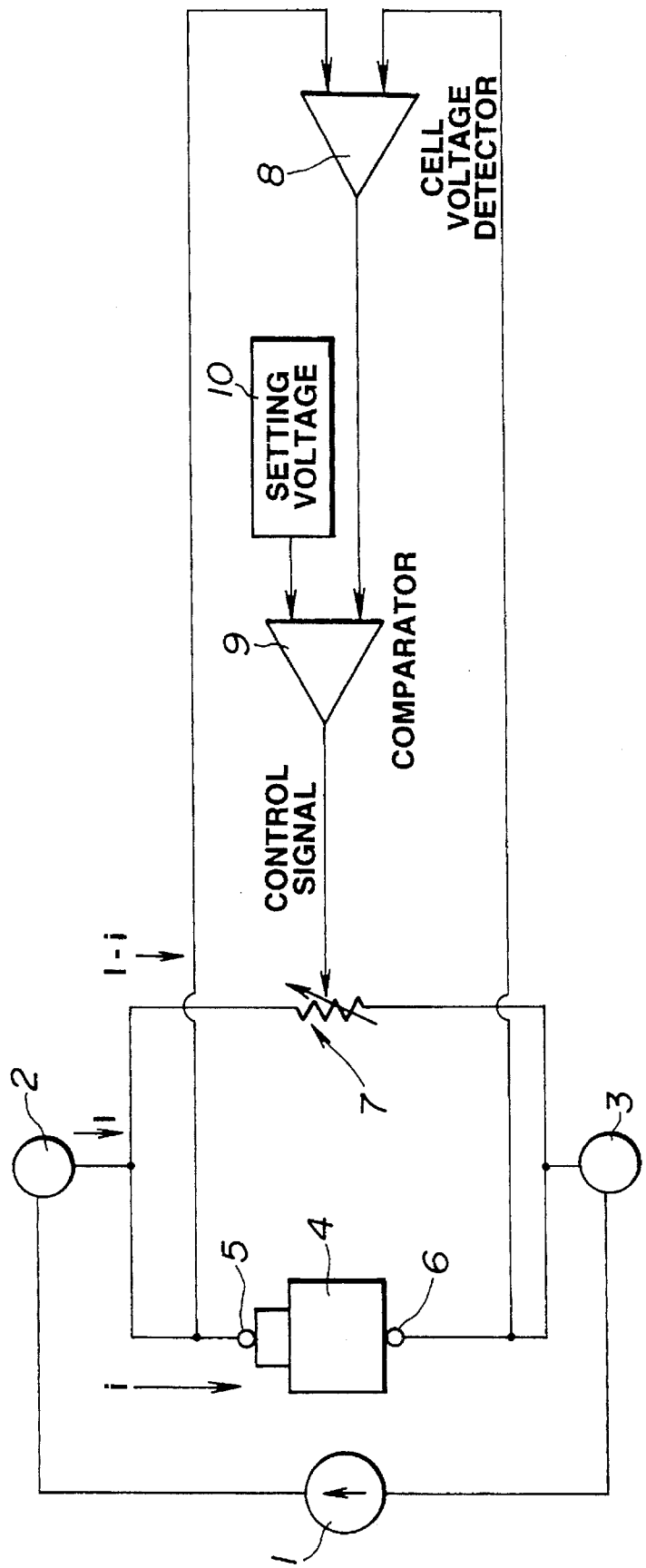
FIG. 2 is a block diagram showing a battery charging device according to a first embodiment of the present invention.

Referring first to FIG. 2, showing a battery charging device according to the first embodiment of the present invention, a positive electrode and a negative electrode of a dc current source 1 are connected to a positive electrode terminal 2 and a negative electrode terminal 3, respectively. The positive electrode terminal 2 is connected to a positive electrode terminal for charging 5, in turn connected to a positive terminal of a battery 4, while the negative electrode terminal 3 is connected to a negative electrode terminal for charging 6, in turn connected to a negative terminal of the battery 4. A variable resistor 7 is connected across the positive electrode terminal 3 and the negative electrode terminal 3 in parallel with the cell 4.

A cell voltage detector 8 has its input terminals connected to the positive electrode terminal for charging 5 and the negative electrode terminal for charging 6, while having its output terminal connected to one of inputs of a comparator 9, the other input of which is connected to a voltage setting circuit 10 for outputting a setting voltage for setting the charging voltage of the cell 4. The comparator 9 has its output connected to the variable resistor 7 for variably controlling the resistance value of the variable resistor 7.

The cell 4 may be a lithium ion cell or a nickel cadmium cell.

The above-described battery charging device according to the first embodiment of the present invention operates as follows.

The cell 4 is loaded on the battery charging device so that the positive terminal and the negative terminal of the cell 4 are contacted with the positive electrode terminal for charging 5 and the negative electrode terminal for charging 6, respectively. This establishes the chargeable state of the charging device. If the current source 1 is turned on in this state, the electrical power from the current source 1 is supplied via the positive electrode terminal 2 and the negative electrode terminal 3 to the cell 4 for starting the charging.

On starting the charging, the cell voltage detector 8 detects the current voltage value appearing across the electrode terminals 5, 6 of the cell 4 and transmits the detected voltage value to the comparator 9 fed with the pre-set voltage from the voltage setting circuit 10. The comparator 9 compares the preset voltage to the current voltage of the cell and transmits the difference voltage value to the variable resistor 7.

Thus the resistance value of the variable resistor 7 is controlled depending on the charging state of the cell 4.

More specifically, since the initial voltage of the cell 4 is low, the resistance value of the variable resistor 7 is controlled to be higher. Thus the setting current I from the current source 1 is supplied in its entirety to the cell 4, as shown at a domain A in FIG. 3, so that the voltage value of the cell 4 gradually approaches the setting voltage. Then, when the current voltage value of the cell 4 becomes equal to the setting voltage, the resistance value of the variable resistor 7 is controlled to be lowered gradually. Thus the setting current I from the current source 1 is divided into a current i flowing through the cell 4 and a current I-i flowing through the variable resistor 7, depending on the resistance value of the variable resistor 7.

Figure 3:
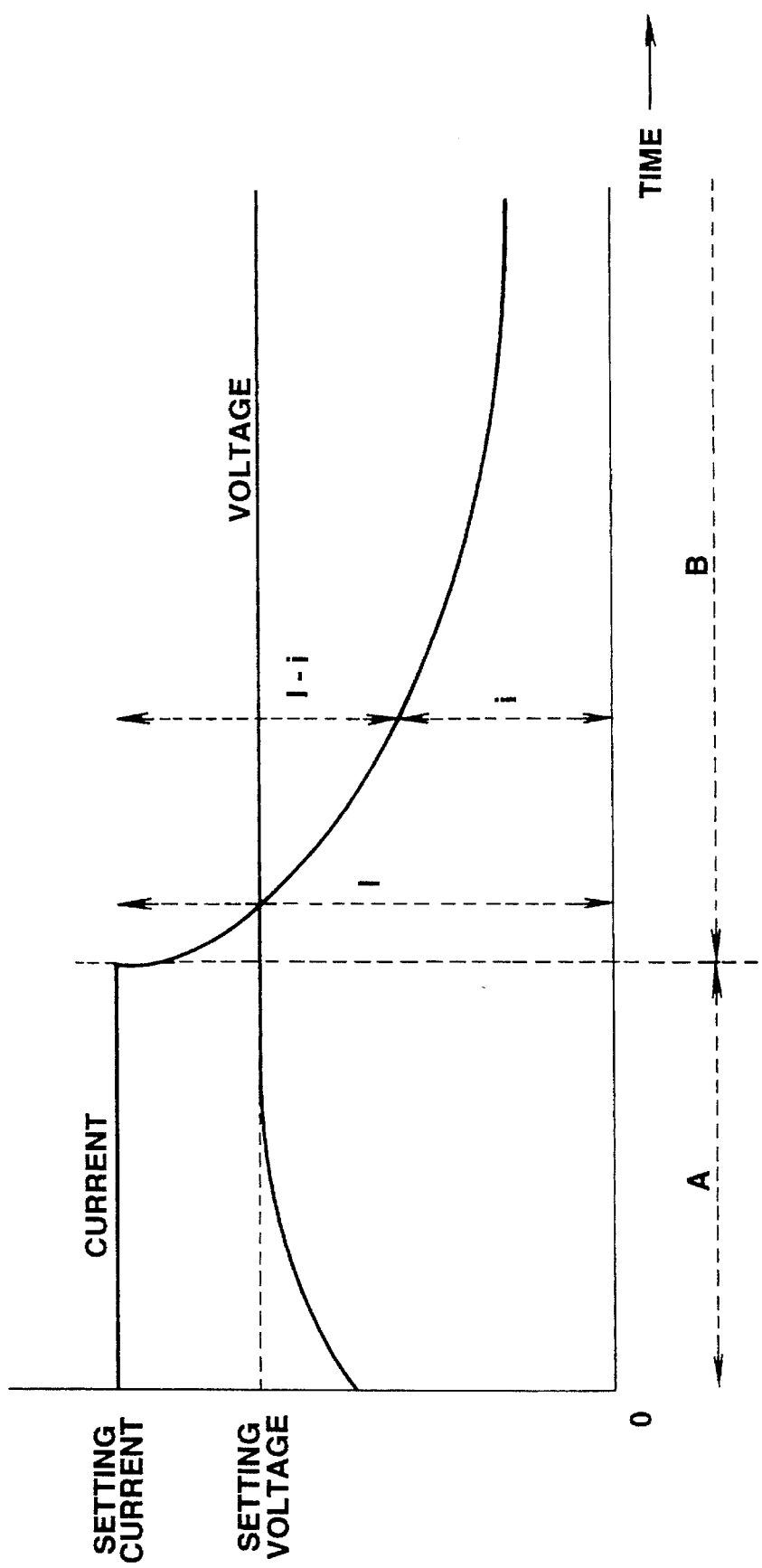
FIG. 3 is a graph for illustrating charging current control of the battery charging device shown in FIG. 2.

Consequently, the current supplied to the cell 4 can be gradually lowered with rise in the voltage value of the cell 4, that is with the progress in the charging state, as shown in FIG. 3, thus rendering it possible to prevent excess charging and assuring full charging of the cell 4 in safety.

Figure 4:
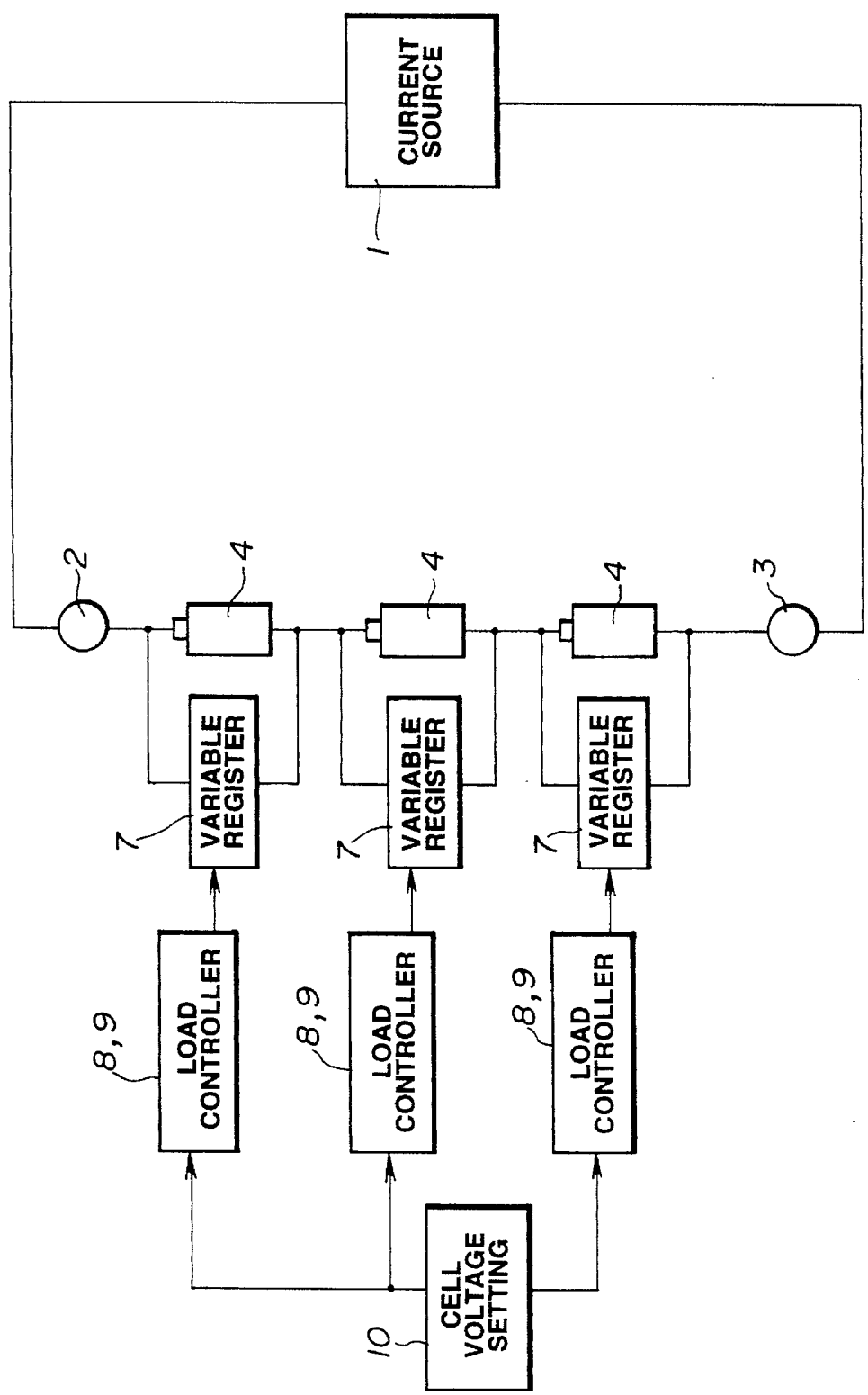
FIG. 4 is a block diagram showing a battery charging device according to a second embodiment of the present invention.

FIG. 4 shows a battery charging device according to a second embodiment of the present invention in which plural battery charging devices shown in FIG. 2 are provided as charging units, which charging units are connected in series for charging the cells 4 at the time.

It is possible with each charging unit to control the current supplied to the cell 4 so as to be lowered gradually as the charging state of the cell 4 progresses, so that excess charging of each cell 4 may be prevented from being induced. Since the excess charging can be prevented in this manner, each cell may be charged fully in safety without fluctuations from cell to cell. On the other hand, since such control can be made separately for the respective cells, integrated charging can be continued until all of the cells are charged fully, thus rendering it possible to shorten the charging time of the cells 4.

Figure 5:
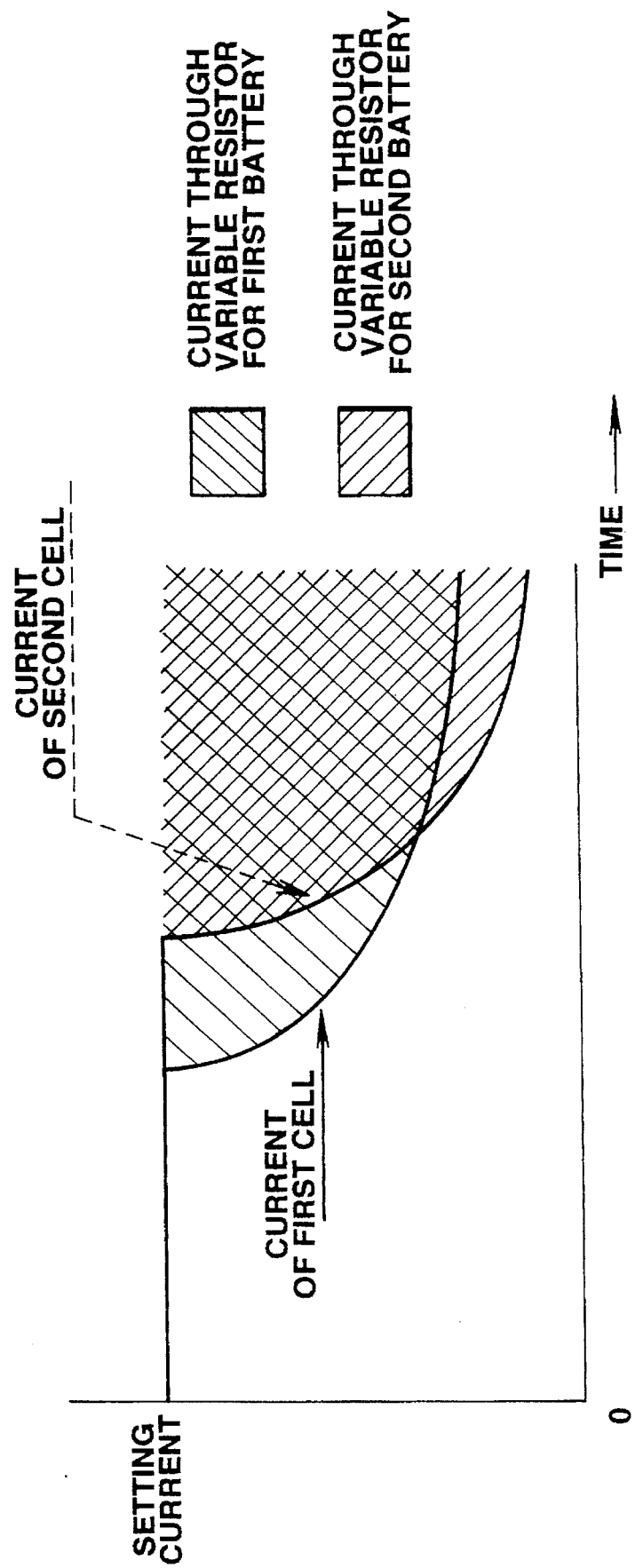
FIG. 5 is a graph for illustrating charging current control of the battery charging device shown in FIG. 4.

Meanwhile, if such current control is performed, the current flowing through each cell 4 is gradually lowered as the cell 4 approaches the fully charged state, as shown by a solid line in FIG. 5. However, the current which has ceased to flow through the cell 4 now flows through the variable resistor 7 as indicated by right hatching lines and left hatching lines in FIG. 5. Thus the current continues to flow through the variable resistor 7 after the cell 4 has become charged fully which means wasteful power consumption. Besides, there is a risk that the variable resistor 7 be destructed by heat evolution.

Figure 6:
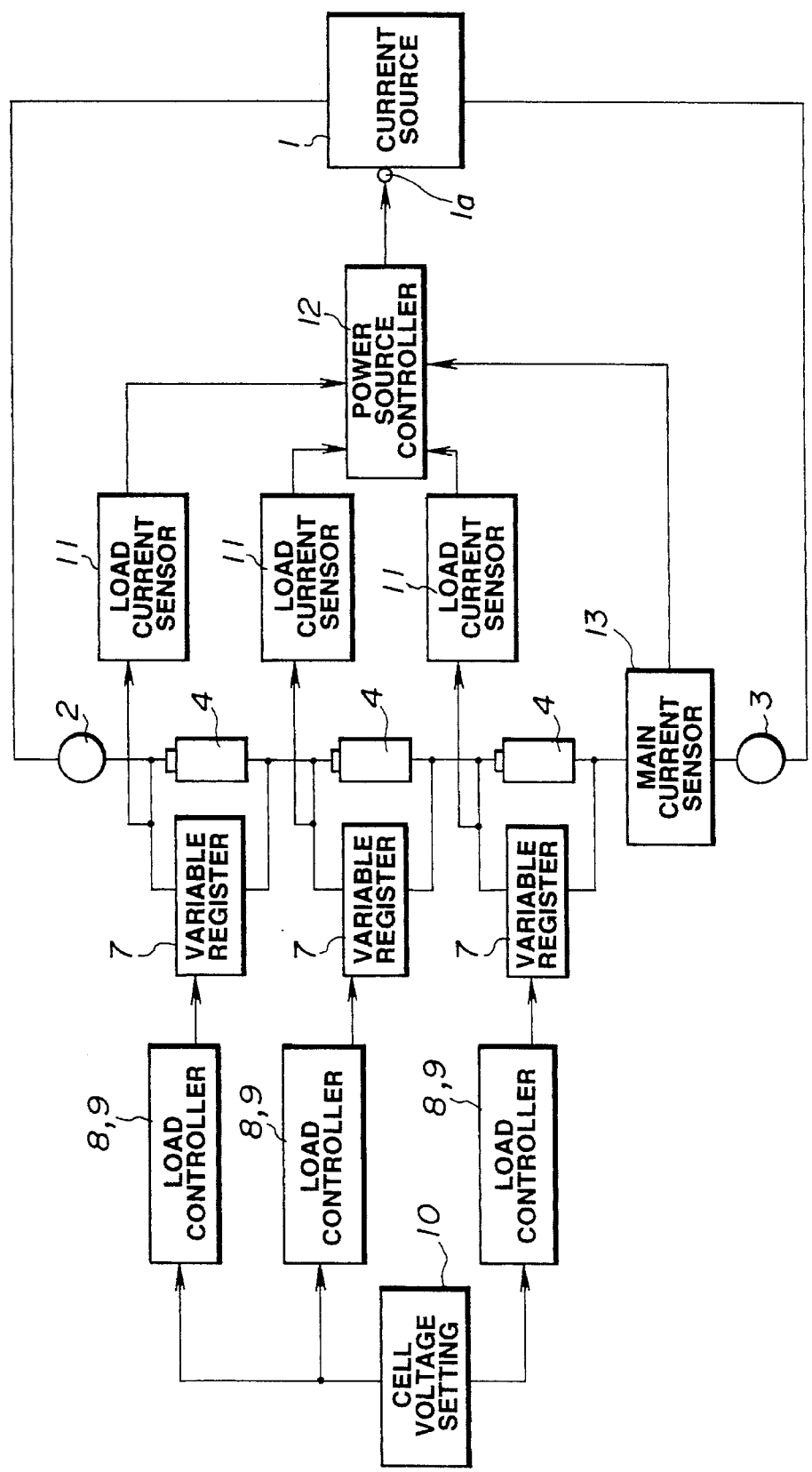
FIG. 6 is a block diagram showing a battery charging device according to third and fourth embodiments of the present invention.

In the battery charging device according to the third embodiment of the present invention, shown in FIG. 6, a current source 1 has a variable output current value. Each of plural series-connected charging units has a load current sensor 11 for detecting the current value of the variable resistor 7 and a main current sensor 13 for detecting the output current value of the current source 1 as well as a power source controller 12 for controlling the output current value of the current source 1 based upon the detection output of the load current sensor 11 and the main current sensor 13.

The battery charging method according to the present invention is applicable to the battery charging device shown in FIG. 6 as well.

If, with the battery charging device, shown in FIG. 6, the charging is started and the excess charging of the cell 4 is approached, such that current starts to flow partially through the variable resistor 7, each load current sensor 11 detects the current value of the variable resistor 7 and routes the detected output to the current sensor controller 12. The main power source 13 detects the output current value of the current source 1 and routes the detected output to the power source controller 12.

The power source controller 12 detects the least current value imin among the current values from the load current sensors 11. The fact that the current value of a given variable resistor 7 is smallest means that the cell 4 provided in the charging unit having the variable resistor 7 is charged to the least extent. Thus the power source controller 12 subtracts the least current value from the current output current value of the current source 1 as detected by the main current sensor 13 to generate a current control signal equal to the current output current value of the current source less imin which is routed via a control terminal 1a to the current source 1.

In this manner, the output current value may be set so as to be equal to the value indicated by the current control signal.

Figure 7:
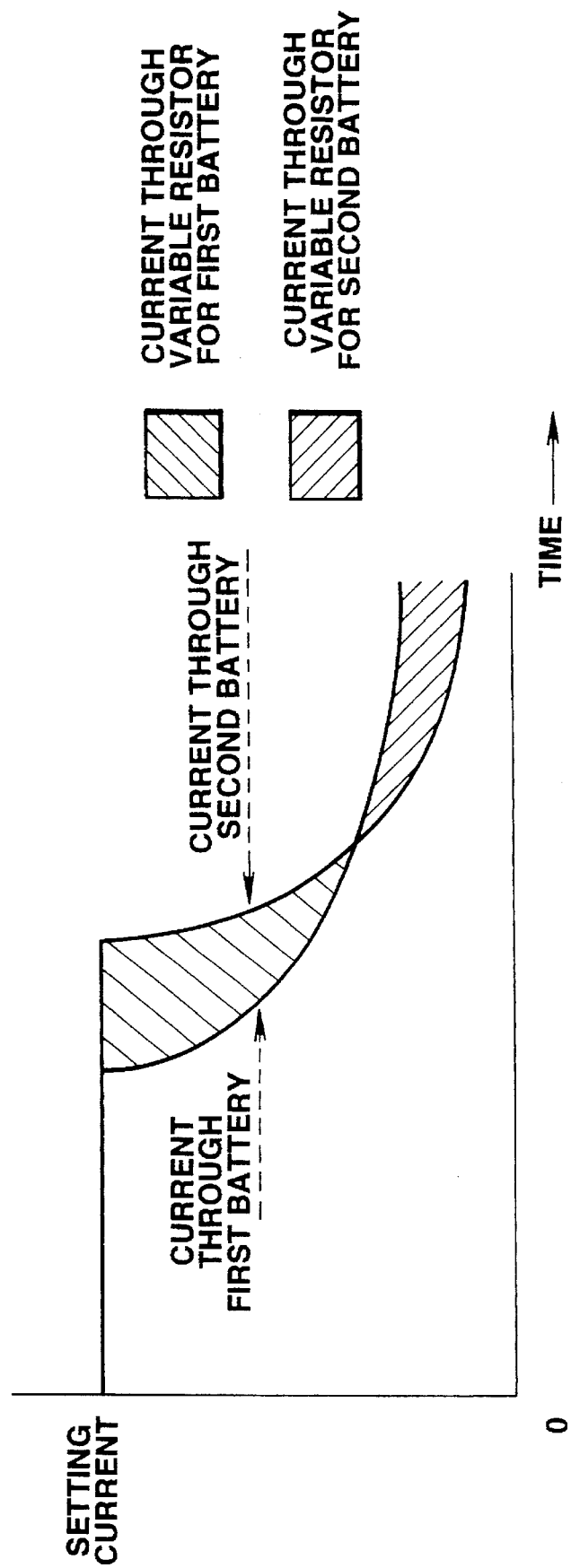
FIG. 7 is a graph for illustrating charging current control of the battery charging device according to the third embodiment.

Thus, by subtracting the least current value from the output current value of the current source 1 to give a differential current, and by controlling the output current value of the current source 1 so as to be equal to the differential current, the output current value of the current source 1 can be lowered gradually as the charging of the cell 4 at the most belated charging state proceeds, as shown in FIG. 7.

Consequently, the current source 1 can be turned off when the cell 4 in the most belated charging state has become charged fully, so that, when charging plural cells 4 in series, these cells 4 can be fully charged without variations from cell to cell with the minimum power consumption. In addition, since the output current value of the current source 1 can be lowered as the cell 4 in the most belated charging state is charged, the current flowing through the variable resistors 7 of the remaining charging units can be lowered and hence the variable resistors 7 may be prevented from being destroyed assuring safe charging. Since the charging may be continued until all of the cells are in fully charged state, it becomes possible to reduce the time which should be necessitated until all cells are in the fully charged state.

With the fourth embodiment of the battery charging device of the present invention, the following control operations are performed for further assuring the operational safety.

Referring to FIG. 6, the fourth embodiment of the battery charging device of the present invention, will be described the power source controller 12 detects, on starting the charging, the maximum current imax among the current values flowing through the variable resistor 7, based upon the detection outputs of the load current sensors 11.

On the other hand, the power source controller 12 subtracts the maximum load setting value, representing the maximum current value tolerated by the variable resistor 7, from the maximum current value, to generate a first differential subtraction current value, while detecting the polarity of the first subtraction current.

The power source controller 12 generates, from the output current value of the current source 1 as detected by the main current sensor 13, the first substraction current value, to generate a second subtraction current value, and controls the current source 1 so that the output current value of the current source 1 will become equal to the second substraction current value only when the first subtraction current value is of the positive polarity.

That is, the first subtraction current value is the above-mentioned maximum current value less the maximum load setting value of the variable resistor 7, and represents the charging state of the cell 4 provided in the associated charging unit.

Specifically, the fact that the current value of the variable resistor 7 is of the maximum value means that the cell 4 provided in the charging unit having the variable resistor 7 is in the most advanced charging state. However, the fact that the first subtraction current is of the negative polarity means that the current flowing through the associated charging unit can be increased. Thus the power source controller does not perform a control operation of lowering the output current of the current source 1.

Conversely, the first substraction current being of a positive polarity means that the current in excess of the maximum load setting value is flowing through the variable resistor 7 provided in the charging unit. Thus the power source controller 12 controls the current source 1 for lowering the output current value of the current source 1.

If such control operation is performed, the output current value of the current source 1 can be lowered depending on the charging state of the cell 4 in the most advanced charging state, so that charging of the remaining cells 4 is delayed. However, when the current flowing through the variable resistor of the charging unit associated with the cell 4 in the most advanced charging state exceeds the maximum load setting value, the current can be lowered instantaneously. Thus the variable resistor 7 can be protected and prevented from being destroyed under heat evolution. The result is that the cells 4 in their entirety can be charged in safety.

The battery pack according to the fifth embodiment of the present invention is now explained with reference to FIG. 8.

Figure 8:
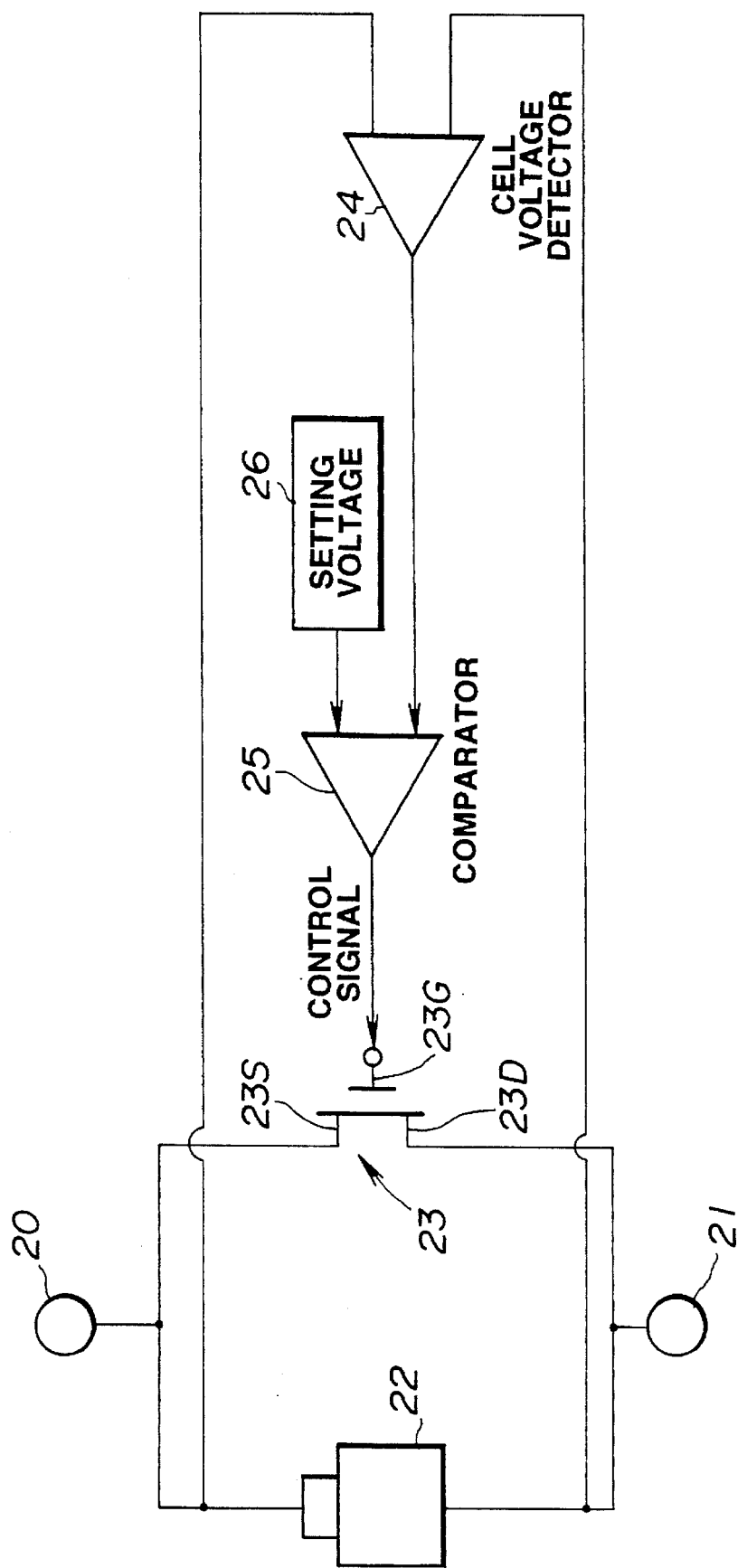
FIG. 8 is a block diagram showing a battery charging device according to a fifth embodiment of the present invention.

With the fifth embodiment of the battery pack of the present invention, a positive electrode terminal 20 and a negative electrode terminal 21, respectively connected to a positive electrode and a negative electrode of a dc current source, are respectively connected to a positive electrode and a negative electrode of a secondary cell 22, as shown in FIG. 8.

A variable resistor consisting in a field effect transistor FET 23 is connected in parallel with the secondary cell 22 across the positive electrode terminal 20 and the negative electrode terminal 21. The FET 23 has its source electrode 23S and drain electrode 23D connected to the positive electrode terminal 20 and to the negative electrode terminal 21, respectively.

A cell voltage detector 24 has its input terminals connected to the positive electrode terminal 20 and the negative electrode terminal 21, while having its output terminal connected to one of inputs of a comparator 25, the other input of which is connected to a voltage setting circuit 26 for outputting a pre-set voltage for pre-setting the charging voltage of the secondary cell 22. The comparator 25 has its output connected to the gate electrode 23G of the FET 23.

The current flowing through the source electrode 23S and the drain electrode 23D of the FET 23 can be controlled by the output of the comparator 25 for controlling the current flowing through the secondary cell 22.

The cell 22 may be a lithium ion cell or a nickel cadmium cell.

The above-described battery charging device according to the fifth embodiment of the present invention operates as follows.

When the positive electrode terminal 20 and the negative electrode terminal 21 are respectively connected to the positive and negative electrode terminals of the current source, respectively, and the current source is turned on, the electric power from the current source is supplied via the positive electrode terminal 20 and the negative electrode terminal 21 to the secondary cell 22 for starting the charging.

On starting the charging, the cell voltage detector 24 detects the current voltage value of the secondary cell 22 and transmits it to the comparator 25 which is fed with the pre-set voltage from the voltage setting circuit 26. The comparator 25 compares the pre-set voltage value to the current voltage value of the secondary cell 22 and routes the difference voltage to the gate electrode 23G of the FET Thus the current flowing through the source 23S and the drain 23D of the FET 23 is variably controlled depending on the charged state of the secondary cell Specifically, since the initial voltage of the secondary cell 22 is low, the current flowing through the FET 23 is controlled to be smaller. Thus the pre-set current I from the current source is supplied in its entirety to the secondary cell 22 so that the voltage thereof gradually approaches to the pre-set voltage. When the current voltage value of the secondary cell 22 becomes equal to the pre-set voltage, the current flowing through the FET 23 is controlled to be increased gradually. Thus the pre-set current I from the current source is divided into a partial current flowing through the secondary cell 22 and a partial current flowing through the FET 23 I-i, depending on the change in current flowing through the FET 23, as indicated by a domain B in FIG. 3.

Thus the current value supplied to the secondary cell 22 can be decreased gradually as the voltage value of the secondary cell 22 is increased, that is with the progress of charging of the cell 22, thus rendering it possible to prevent excess charging to assure full charging of the cell 22 in safety.

Figure 9:
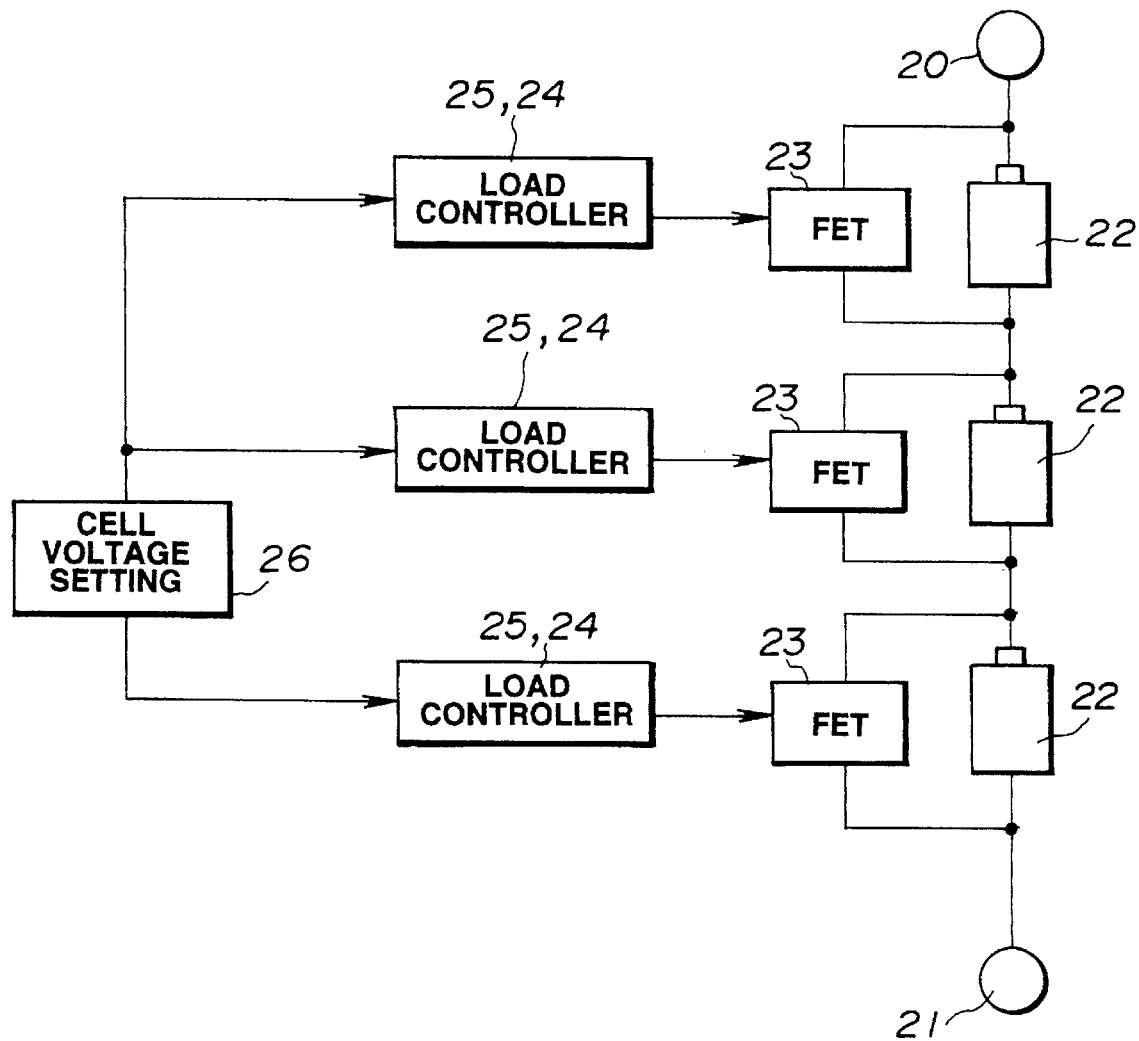
FIG. 9 is a block diagram showing a battery charging device according to a sixth embodiment of the present invention.

With a battery pack according to a sixth embodiment of the present invention, as shown in FIG. 9, a plurality of circuit sections of the battery packs such as that shown in FIG. 8 are provided as charging units, which are connected in series for charging the secondary cells 22 at a time.

Each of the charging units performs the control operation of gradually lowering the current supplied to the secondary cells 22 with the progress in the charging of the cells 22 for preventing overcharging of the secondary cells 22. Since the overcharging can be prevented in this manner, each cell can be charged fully in safety without variations from cell to cell. Since such control can be performed separately for each secondary cell 22, integrated charging can be continued until all of the secondary cells 22 are fully charged, thus rendering it possible to shorten the charging time for the secondary cells 22.

Meanwhile, if such current control is performed, the current flowing through each cell 22 is gradually lowered as the cell approaches to the fully charged state, as shown by a solid line in FIG. 5. However, the current which has ceased to flow through the cell 4 now flows through the FET 23 as indicated by right hatching lines and left hatching lines in FIG. 5. Thus the current continues to flow through the FET 23 after the cell 4 has become charged fully which means wasteful power consumption. Besides, there is a risk that the variable resistor 7 be destructed by heat evolution.

Consequently, with the battery pack according to the seventh embodiment of the present invention, a load current sensor 27 for detecting the current value through the FET 23 is provided in each of plural series-connected charging units, and a main current sensor 30 is provided for detecting the output current value of the current source, while a power source controller 28 is provided for controlling the output current value of the current source based upon detection outputs of the load current sensors 27 and the main current sensor 30. The main current controller 28 outputs a current control signal for controlling the variable output current value of the current source based upon the detection outputs of the load current sensors 27 and the main current sensor 30.

The battery charging method according to the present invention is applied to the battery pack of the present seventh embodiment as well.

Figure 10:
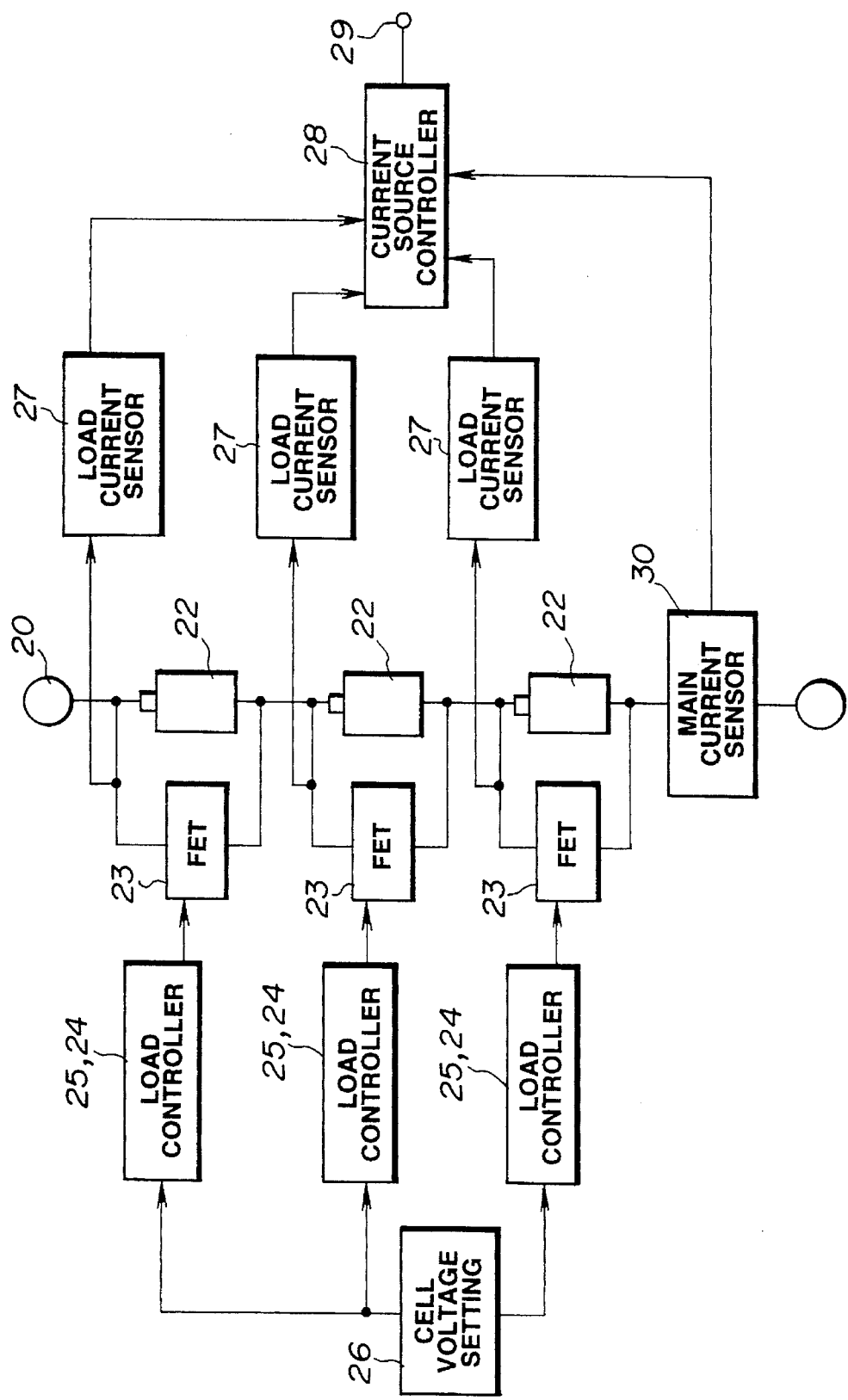
FIGS. 10 is a block diagram showing a battery charging device according to seventh and eighth embodiments of the present invention.

With the battery pack, shown in FIG. 10, when the charging is started and the secondary cell 22 has become nearly fully charged, such that the current starts to flow partially through the FET 23, each, load current sensor 27 detects the current value of the FET 23 and transmits the detected output to the power source controller 28. The main current sensor 30 detects the output current value of the current source and transmits the detected output to the power source controller 28.

The power source controller 28 detects the minimum current value imin among respective current values from the load current sensors 27. The fact that the current value of the FET 23 is minimum indicates that the charging of the secondary cell 22 provided in the charging unit having such FET 23 is in the most belated state. Thus, with the present battery pack, the power source controller 28 subtracts the minimum current value from the current output current value of the current source as detected by the main current sensor 30 to generate a current control signal equal to the current output current value of the current source less imin and transmits the current control signal thus generated to the current source.

Thus the output current value corresponding to the current control signal may be outputted by the current source.

By subtracting the minimum current value from the output current value of the current source, and by outputting the current control signal which may be equal to the resulting differential signal, the output current value of the current source may be gradually lowered as the charging of the secondary cell 22 in the most belated state progresses, as shown in FIG. 7.

Consequently, the current source may be turned off when the secondary cell 22 in the most belated charging state has become charged fully, such that all of the secondary cells 22 can be fully charged with the minimum power consumption without variation from cell to cell in case of charging the secondary cells 22 in parallel. On the other hand, the output current value of the current source can be decreased as the charging of the secondary cell 22 in the most belated charging state progresses, so that the current flowing through the FETs 23 of the remaining charging units may be diminished thus preventing heat evolution in and resulting destruction of the FET 23 for assuring safe charging. Since the charging can be continued until all of the secondary cells 22 are charged fully, it becomes possible to complete the full charging of all of the cells in a shorter time.

With the eighth embodiment of the battery pack of the present invention, the following control operations are performed for further assuring operational safety.

Referring to FIG. 10, the eighth embodiment of the battery charging device of the present invention will be described, the power source controller 28 detects, on starting the charging, the maximum current imax among the current values flowing through the FET 23, based upon the detection outputs of the load current sensors 27.

On the other hand, the power source controller 28 subtracts the maximum load setting value, representing the maximum load setting value indicating the maximum current value tolerated by the FET 23, from the above-mentioned maximum current value, to generate a first subtraction current value, while detecting the polarity of the first subtraction current value.

The power source controller 28 generates, from the output current value of the current source as detected by the main current sensor 30, the first subtraction current value, to generate a second subtraction current value, and issues a control current signal so that the output current value of the current source will become equal to the second subtraction current value only when the first subtraction current value is of the positive polarity.

That is, the first subtraction current value is the above-mentioned maximum current value less the maximum load setting value for the FET 23 and represents the charging state of the secondary cell 22 provided in the associated charging unit.

Specifically, the fact that the current value of the FET 23 is of the maximum value means that the cell 22 provided in the charging unit having the FET 23 is in the most advanced charging state. However, the fact that the first subtraction current is of the negative polarity means that the current flowing through the associated charging unit can be increased. Thus the above current control signal is not outputted by the power source controller 28.

Conversely, the first substraction current being of the positive polarity means that the current in excess of the maximum load setting value is flowing through the FET 23 provided in the charging unit. Thus the power source controller 28 outputs a current control signal of lowering the output current value of the current source.

If such current control signal is outputted, the output current value of the current source can be lowered depending on the charging state of the cell 22 in the most advanced charging state, so that charging of the remaining cells 4 is delayed. However, when the current flowing through the FET 23 of the charging unit associated with the cell 22 in the most advanced charging state exceeds the maximum load setting value, the current can be lowered instantaneously. Thus the FET 23 can be protected and prevented from being destroyed under heat evolution. The result is that the cells 4 in their entirety can be charged in safety.

Although the variable resistors 7 or the FETs 23 are employed as variable current means in the above-described embodiments, these may be replaced by any circuits capable of controlling the current value. In addition, the lithium ion cells or nickel cadmium cells, employed as cells in the above-described embodiments, may also be replaced by any other types of cells. Also, there is no limitation to the shape of the cells and any of button-shaped, gum-shaped or cylindrically-shaped cells may be employed.

Figure 11:
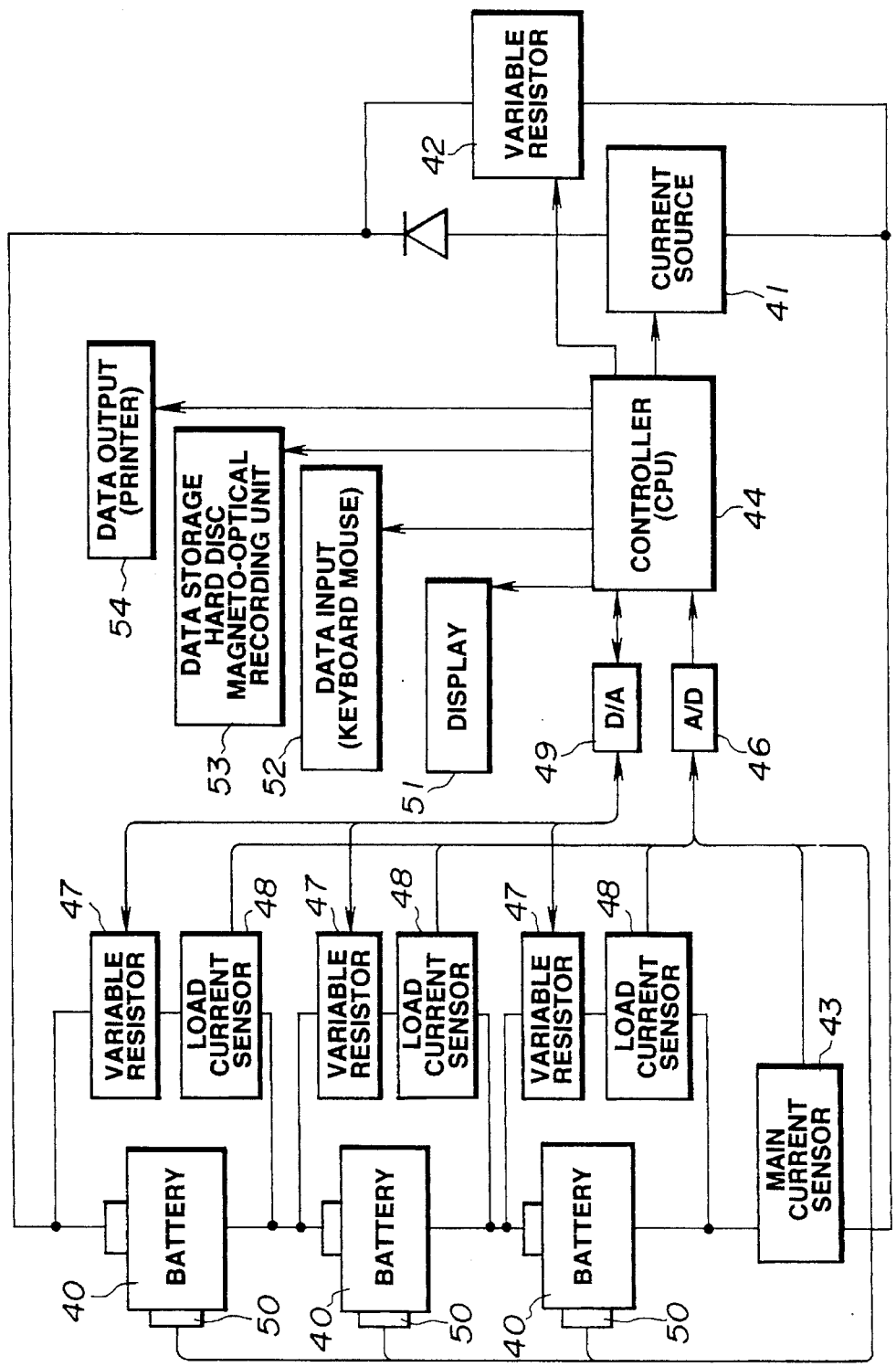
FIG. 11 is a block diagram, showing a battery evaluating device according to a ninth embodiment of the present invention.

FIG. 11 shows a battery evaluation device according to a ninth embodiment of the present invention, comprising a series circuit of a set of three chargeable cells 40 in a main current path and a parallel circuit of a current source 41 and a variable resistor 42, provided in the main circuit path, for evaluating the series-connected cell set. There is also connected a main current sensor 43 for detecting the current flowing through the main current path.

The current source 41 is a variable current source for supplying the charging current to the set of the three cells 40 and has its output current controlled in magnitude by a controller 44. The current source 41 is designed to supply the charging current to the cell set via a current reversal inhibiting diode 45. The variable resistor 42 is comprised of, for example, an FET through which flows the discharge current of the set of the cells 40, and has its resistance similarly controlled by the controller 44. The main current sensor 43 detects the current flowing through the main current path and transmits the detected current value to the controller 44 via an A/D converter 46.

The battery evaluating device also includes three series circuits of variable resistors 47 and load current sensors 48, each of the series circuits being connected to the cell 40 of the set of cells. Each variable resistor 47 is adapted to vary the charging current flowing through the associated cell 40 and has its resistance value controlled by a control signal supplied from the controller 44 via the D/A converter 49. Each load current sensor 48 detects the current flowing through the variable resistor 47 and routes the detected current value to the controller 44 via the A/D converter 46.

The battery evaluating device also includes three temperature sensors 50 associated with the cells 40 of the set of cells. Each temperature sensor 50 detects the temperature in each cell 40 and transmits the detection output to the controller 44 via the A/D converter 46.

The battery evaluating device also includes a display unit 51 connected to the controller 44, a data entry unit 52 such as a keyboard or a mouse, a data storage unit 53 such as a hard disc or a magneto-optical recording unit and a data outputting unit 54, such as a printer.

In the present battery evaluating device, the controller 44 is comprised of a micro-computer for controlling the current source 41 and the variable resistors 42, 47 in accordance with a battery evaluation program of a test pattern comprising an optional combination of charging, discharging and dwell depending upon evaluation conditions supplied from the data entry unit 52, as well as for evaluating the performance of the set of cells 40 based upon the detection outputs of the main current sensor 43, load current sensors 48 and the temperature sensors 50.

The controller 44 is responsive to the values of the load currents detected by the load current sensors 48 for controlling the variable resistor 42 for maintaining the charging voltage value for each cell 40 at a pre-set value, as well as for controlling the current source 41 for preventing an overcurrent from flowing through the variable resistors 47 and the load current sensors 48. The controller 44 also controls the current source 41 based on the current value as detected by the current sensor 43 for maintaining the current flowing in the main current path at a value less than a pre-set value.

This enables the cells 40 to be charged fully in safety without the risk of overcharging even when there is a difference in the cell capacities.

The controller 44 outputs the results of execution of the battery evaluation program to the display unit 51 or to the data outputting unit 54. The evaluation result data is stored in the data storage unit 53.

The test pattern setting operation is carried out by the data entry unit 52 and the display unit 51.

It is noted that the controller 44 comprising the above-mentioned micro-computer has the following software functions for battery evaluation.

1) Initial Power-on Check Function

After the main power source is turned on, the controller 44 checks the contents of (i) the communication function; (ii) detected current values of the main current sensor 43 and the load current sensors 47; (iii) detected values of the temperature sensors 50; (iv) unusual outputs of the module controllers, such as variable resistors 47; (v) unusual states of the current source 41; and (vi) unusual states of the variable resistor 41. Should any unusual state be detected, the contents are displayed on the display unit 51 and stored in the data storage unit 53.

2) Function of Setting the Charging/Discharging Conditions

The controller 44 sets the charging/discharging patterns and the number of pattern execution cycles. The charging/discharging patterns consist in the combination of five operating modes, namely charging 1, charging 2, discharging, dwell and DCR amounting to 99 at the maximum.

In each of the operating modes, the following parameters are set.

(Charging 1)
(i) Data Storage (whether data is to be stored or not);
(ii) Data Sampling Time on the order of 1 second to 10 minutes;
(iii) Charging Current Value of 0.00 to 400.00 A, which is the current value of the current source 41;
(iv) Charging Voltage Value of 0.000 to 5.000 V, which is the charging voltage of each cell 40;
(v) Load Current value of 0.00 to 10.00 A, which is the maximum value of each load current;
(vi) Charging Stop Conditions, comprising one or more of the current of 0.00 to 400.00 A, the voltage of 0.000 to 5.000 V and the charging time of 00H00M00S to 12 H00M00S, and
(vii) Monitored Values, namely the upper limit current of 0.00 to 410.00 A, the upper limit voltage of 0.000 to 5.100 V and the upper limit temperature of 0.00° to 100.0° C. It is noted that the check operation is terminated for the current reading of all cells of not higher than the pre-set value (0.00 to 400.00 A), the voltage reading of one of the cells of not lower than the pre-set value (0.000 to 5.000 V and after lapse of the setting time of 00H00M00S to 12H00M00S since the start of charging. The values monitored are reading values from the modular controller.

(Charging 2)
(i) Data Storage (whether data is to be stored or not);
(ii) Data Sampling Time on the order of 1 second to 10 minutes;
(iii) Charging Current Value of 0.00 to 400.00 A, which is the current value of the current source 41;
(iv) Charging Voltage Value of 0.000 to 35.000 V, which is the charging voltage of the cell set;
(v) Charging Stop Conditions, comprising one or more of the current of 0.00 to 400.00 A, the voltage of 0.000 to 5.000 V and the charging time of 00H00M00S to 12 H00M00S, and
(vi) Monitored Values, namely the upper limit current of 0.00 to 410.00 A, the upper limit voltage of 0.000 to 5.100 V and the upper limit temperature of 0.00° to 100.0° C. It is noted that the check operation is terminated for the current reading of all cells of not higher than the pre-set value, the voltage reading of one of the cells of not lower than the pre-set value and after lapse of the pre-set time since the start of charging. The values monitored are reading values from the modular controller.

(Discharging)
(i) Data Storage (whether data is to be stored or not);
(ii) Data Sampling Time on the order of 1 second to 10 minutes;
(iii) Selection and Value Setting of Load Operating Modes; one of the constant current of 0.00 to 400.00 A or the constant power of 0 to 14000 W is selected;
(iv) Charging Stop Conditions, comprising one or more of the voltage of 0.000 to 5.000 V and the charging time of 00H00M00S to 12 H00M00S, and
(vi) Monitored Values, namely the upper limit current of 0.00 to 410.00 A, the upper limit voltage of 0.000 to 5.100 V and the upper limit temperature of 0.00° to 100.0° C. It is noted that the check operation is terminated for the current reading of all cells of not higher than the setting value, the voltage reading of one of the cells of not lower than the pre-set value and after lapse of the setting time since the start of charging. The values monitored are reading values from the modular controller.

(Dwell)
(i) Data Storage (whether data is to be stored or not);
(ii) Data Sampling Time on the order of 1 second to 10 minutes;
(iii) Dwell Time, that is the time of cutting off the charging/discharging current, is set within a range of 00H00M00S to 12H00M00S.

(DCR (direct current resistance))
(i) Data Storage (whether data is to be stored or not);
(ii) Data Sampling Time on the order of 1 second to 10 minutes;
(iii) Constant Current 1 (I1) which is 0.00 to 400.00 A;
(iv) Constant Current 2 (I2) which is 0.00 to 400.00 A;
(v) Discharging Time 1 (T1), which is 00S to 59S and continues since start of charging until lapse of the pre-set time;
(vi) Discharging Time 2 (T2), which is 00S to 59S and continues since start of charging until lapse of the setting time;
(vii) Monitored Values, namely the upper limit current of 0.00 to 410.00 A, the upper limit voltage of 0.000 to 5.000 V and the upper limit temperature of 0.00° to 100.0° C. The values monitored are reading values from the modular controller.

3) Function of Starting/Terminating Discharging Test

The controller causes the charging/discharging test to be started or terminated. On starting the test, the controller sets the following cell parameters:
(i) name of the cell set (in ten characters);
(ii) number of the cell set (in ten characters);
(iii) cell numbers of from 1 to 7 (each in seven characters);
(iv) volume in 0.000 to 99.999 l;
(v) weight in 0.000 to 99.999 kg;
(vi) ambient temperature of from 0.00° to 100.0° C.

4) Function of Displaying/ printing Voltage, Current and Temperature

The voltage, current and the temperature are read out from each cell from a modular controller and displayed on the display unit 51 or printed on the data outputting unit 51.

Readout is carried out at an interval of three seconds for displaying the latest data no matter whether the charging/discharging test is going on or discontinued. The display/printing is made by data (numerical values) or by a histogram.

5) Function of Displaying/Printing Measured Results

The following contents are calculated step-by-step from the file of the measured data so as to be displayed on the display unit 51 or printed by the data outputting unit 54.

(Charging 1)
(i) Charging capacity of each cell (AH, WH)
(ii) Maximum/minimum temperature values (for each temperature sensor 50)
(iii) Start/end voltages across the cells and the cell set (Charging 2)
(i) Charging capacity of each cell (AH, WH)
   AH: integrated value of the current (A)/charging time (H)
   WH: integrated value of the voltage (V)/charging time (H)
(ii) Maximum/minimum temperatures (for each temperature sensor 50)
(iii) Start/end voltages across the cells and the cell set (Discharging)
(i) Discharging capacity of each cell (AH, WH)
   AH: integrated value of the current (A)/discharging time (H)
   WH: integrated value of the voltage (V)/discharging time (H)
(ii) Maximum/minimum temperatures (for each temperature sensor 50)
(iii) Start/end voltages across the cells and the cell set (Dwell)
(i) Maximum/minimum temperatures (for each temperature sensor 50)
(ii) Start/end voltages across the cells and the cell set (DCR)
(i) The DCR value (direct current resistance value Q) as each cell and as cell set
The DCR value is calculated from the equation $$DCR = |(V1-V2)/(I1-I2)|$$

where V1 and V2 denote the voltage values across both terminals of a unit cell of a set of cells when the current I1 is discharged for T1 seconds and subsequently the current I2 is discharged for T2 seconds.
(ii) The voltage across each unit cell and the set of cells when the currents I1, I2 are caused to flow therethrough.

Other items of Evaluation
(i) Cell parameters
(ii) Start/end time and time duration therebetween (for each step)
(iii) Charging/discharging conditions Other than the monitored items (for each step)

6) Function of Displaying/Printing Measured Data

The following contents from the file of the measured data are displayed on the display unit 51 or printed on the data outputting unit 54.
(i) Sample data and sampling time of each cell voltage, current and temperature
(ii) Cell parameters
(iii) Start/end time and time duration therebetween (for each step)
(iv) Charging/discharging conditions (for each step)

7) Function of Displaying/Printing Charging/Discharging Curves

The following contents from the file of the measured data are displayed on the display unit 51 or printed on the data outputting unit 54.
(i) Charging/ discharging curves (for voltage, current and temperature)
(ii) Cell parameters
(iii) Designation and selection of displayed cells
(iv) Setting of display time axis
(v) Test start date 8) Function of Displaying/Printing Unusual History The unusual contents/ history (date) stored in the data storage unit 53 is displayed on the display unit 51 or printed by the data outputting unit 54.

9) Function of Setting the Method of Storing Measured Data

The following contents concerning storage of measured data are set.

(i) Whether or not data storage is to be made.

If selection is made for not storing data, "store" as set in connection with the charging/ discharging conditions is disregarded.

(ii) Name of data file to be stored

10) Function of Printing Charging/Discharging Conditions

The charging/discharging conditions are printed by the data outputting unit 54.

With the above-described battery evaluation device, the cells 40 may be charged fully by controlling the current source 41 and the variable resistors 42, 47 in accordance with the battery evaluation program of the test pattern consisting in optional combination of charging, discharging and dwell dependent upon evaluation conditions inputted from the data entry unit by the controller 44. Thus, by evaluating the performance of the set of cells made up of the individual cells 40 based upon the detection output of the main current sensor 43, load current sensors 48 and the temperature sensors 50, the capacity difference among the cells, true capacity of the set of cells, and true cyclic characteristics of the set of cells, that is capacity changes due to repeated charging and discharging, can be evaluated safely and accurately. In addition, the actual state of use of the cells or the cell set may be simulated for analyzing troubles produced in the market or prevention of possible troubles as well as pre-shipment quality control satisfactorily.

What is claimed is:

1. A battery charging apparatus for charging a plurality of cells comprising:

a plurality of charging units each connected to a respective one of a plurality of cells, each charging unit having current changing means connected in parallel with a respective cell for changing the current supplied to the cell, cell voltage detection means for detecting a voltage of the cell, pre-set voltage outputting means for outputting a pre-set voltage indicating a pre-set voltage value of the cell, and comparator-control means for comparing the voltage of the cell detected by said cell voltage detection means to the pre-set voltage from said pre-set voltage outputting means for detecting a present voltage of the cell with respect to said pre-set voltage, said comparator-control means controlling said current changing means so that the current flowing through the current changing means is increased as the present voltage value of the cell approaches the pre-set voltage, wherein said plurality of charging units are connected in series with one another;

a power source circuit having a variable output current connected to the plurality of charging units;

a plurality of first current detection means each associated with the current changing means of each charging unit for detecting the current value flowing through each current changing means;

second current detection means for detecting the output current value of said power source circuit; and power source circuit control means for detecting a minimum current value among current values of said current changing means based upon the detection output of each first current detection means and for controlling said power source circuit so that an output current value of the power source circuit becomes a current value equal to the output current value from the power source circuit less the minimum current value.

2. A battery charging apparatus for charging a plurality of cells comprising:

a plurality of charging units each connected to a respective one of a plurality of cells, each charging unit having current changing means connected in parallel with a respective cell for changing the current supplied to the cell, cell voltage detection means for detecting a voltage of the cell, pre-set voltage outputting means for outputting a pre-set voltage indicating a pre-set voltage value of the cell, and comparator-control means for comparing the voltage of the cell detected by said cell voltage detection means to the pre-set voltage from said pre-set voltage outputting means for detecting a present voltage of the cell with respect to said pre-set voltage, said comparator-control means controlling said current changing means so that the current flowing through the current changing means is increased as the present voltage value of the cell approaches the pre-set voltage, wherein said plurality of charging units are connected in series with one another;

a power source circuit having a variable output current connected to the plurality of charging units;

a plurality of first current detection means each associated with the current changing means of each charging unit for detecting the current value flowing through each variable current means;

second current detection means for detecting the output current value of said power source circuit; and power source circuit control means for detecting the maximum current value among current values of said current changing means based upon each detection output of each first current detection means and for generating a first subtraction current value by subtracting a pre-set maximum load value indicating a maximum current value capable of flowing through said variable current means from said maximum current, said power source circuit control means detecting a polarity of the first subtraction current value and generating a second subtraction current value by subtracting said first substraction current value from an output current value of the power source circuit as detected by said second current detection means, said power source control means also controlling said power source circuit so that an output current value of the power source circuit becomes equal to said second subtraction current value only when the first subtraction current value is of a positive polarity.

3. A method for charging a plurality of cells using a power source circuit comprising the steps of:

controlling a plurality of variable current means connected in parallel to said plurality of cells for varying a current supplied to said cells so that the current flowing through said variable current means is gradually increased as a present voltage value approaches a pre-set voltage value;

detecting the current values of said variable current means and detecting a minimum current value from among said current values and an output current value of said power source circuit;

generating a subtraction current value by subtracting the minimum current value of said variable current means from the output current value of the power source circuit; and controlling said power source circuit so that the output current value of said power source circuit becomes equal to said subtraction current value.

* * * * *